(12) United States Patent
Jaggard et al.

(10) Patent No.: US 11,499,719 B2
(45) Date of Patent: Nov. 15, 2022

(54) REGULATOR

(71) Applicant: TCG Partners-Intellectual Property Series, Houston, TX (US)

(72) Inventors: Griffin Tyler Jaggard, Katy, TX (US); Hunter Ryan Jaggard, Katy, TX (US); Stephen Paul Dunn, Houston, TX (US); Stephen Hunter Jaggard, Houston, TX (US)

(73) Assignee: TCG Partners, LLC—Intellectual Property Series, Houston, TX (US)

( * ) Notice: Subject to any disclaimer, the term of this patent is extended or adjusted under 35 U.S.C. 154(b) by 66 days.

(21) Appl. No.: 16/715,322

(22) Filed: Dec. 16, 2019

(65) Prior Publication Data
US 2020/0191402 A1 Jun. 18, 2020

Related U.S. Application Data

(60) Provisional application No. 62/779,712, filed on Dec. 14, 2018.

(51) Int. Cl.
*F23N 1/00* (2006.01)
*F24C 3/12* (2006.01)
*A47J 37/07* (2006.01)

(52) U.S. Cl.
CPC ............ *F24C 3/12* (2013.01); *A47J 37/0713* (2013.01); *F23N 1/007* (2013.01)

(58) Field of Classification Search
CPC .......... F24C 3/12; A47J 37/0713; F23N 1/007
USPC ...................................................... 126/39 R
See application file for complete search history.

(56) References Cited

U.S. PATENT DOCUMENTS

| | | | | |
|---|---|---|---|---|
| 3,353,403 A * | 11/1967 | Deily | ..................... | G01N 11/08 73/54.09 |
| 4,526,532 A * | 7/1985 | Nelson | .................... | F23D 14/38 239/401 |
| 5,046,945 A * | 9/1991 | McGowan | ............ | F17C 13/002 431/344 |
| 5,327,879 A * | 7/1994 | Ferraro | ............... | A47J 37/0786 126/39 E |
| 5,860,409 A * | 1/1999 | Grandveau | ............. | F24C 3/085 126/39 R |
| 7,568,911 B1 * | 8/2009 | Draper | .................... | F23D 14/28 431/231 |

* cited by examiner

*Primary Examiner* — Avinash A Savani
(74) *Attorney, Agent, or Firm* — Winstead PC

(57) ABSTRACT

A regulator assembly is disclosed. The regulator assembly can include a regulator having a gas inlet and a gas outlet. The regulator assembly can also include an extension pipe having a proximal end and a distal end. The regulator assemble can also include an orifice disposed in the extension pipe for modification of the gas flow.

9 Claims, 2 Drawing Sheets

REGULATOR

CLAIM OF PRIORITY

This application hereby claims priority to, U.S. provisional patent application having the Application No. 62/779,712, filed on Dec. 14, 2018. Accordingly, all disclosures made in the 62/779,712 provisional application are hereby incorporated by reference.

FIELD OF INVENTION

The present invention relates generally to a gas flow regulator.

BACKGROUND AND SUMMARY OF THE INVENTION

The disclosed regulator can be used for gas flow control in a variety of settings. In almost all circumstances, gas used to fuel outdoor grilling appliances comes in the form of compressed gas stored in metal storage tanks, or "gas cylinders," "tanks," and/or "bottles." Gas cylinder come in many shapes and sizes, but are most commonly know to come in a "15-pound" or "5 gallon" cylinder or "1-pound" cylinder. Each gas cylinder contains a thick metal body constructed to contain compressed and/or liquefied gas. A release valve is disposed at the top of the cylinder with a threaded connector for transporting gas in and out of the cylinder. In the embodiment(s) described herein, the regulator can be used to control gas such as propane for supply to a burner on a grilling apparatus.

In the standard 15-pound or 1-pound cylinders, the internal pressure can vary depending on several factors but most notably temperature, general effected by outdoor temperature exposure. For instance, the internal pressure of a 15-pound cylinder can range anywhere from 300 pounds per square inch ("psi") on a hot day to as low as low as 40 psi on a cold day. This propane tank pressure must be reduced and be regulated for use in a home, motor home, camper, or an outdoor gas appliance. The regulator attached to the cylinder will restrict the release of that gas to a much lower psi; for use in an outdoor grill that be as low as about ½ psi, or about 11 inch water column. Certain adjustable regulators allow a user to adjust the pressure (or flow) of gas between different predetermined flow rates. For instance, turning from "high" to "medium" to "low" by turning a knob. A problem still exists, however, when the gas flow into a burner needs to be greater than the regulator is designed to provide.

The disclosed regulator provides a user with the means to increase flow rate into a high pressure burner with a lower pressure regulator.

SUMMARY

The accompanying drawings illustrate various exemplary implementations and are part of the specification. The illustrated implementations are proffered for purpose of example, not for purpose of limitation. All illustrations of the drawings are for the purpose of describing selected versions of the present invention and are not intended to limit the scope of the present invention.

One aspect of the disclosed device is to provide a means for increasing the flow or flow rate of a flammable gas (i.e., propane, butane, etc.) to a higher flow or flow rate for use with a high-pressure burner. The disclosed regulator includes an extension pipe with an orifice used to deliver regulated gas to a high-pressure burner. The extension pipe has a built-in orifice, the pipe connects the regulator at a first end and to a burner at a second end. The inset orifice provides several advantages over current regulators on the market.

BRIEF DESCRIPTION OF THE DRAWINGS

The accompanying drawings illustrate various exemplary implementations and are part of the specification. The illustrated implementations are proffered for purpose of example, not for purpose of limitation.

DETAILED DESCRIPTION

Figure 1:
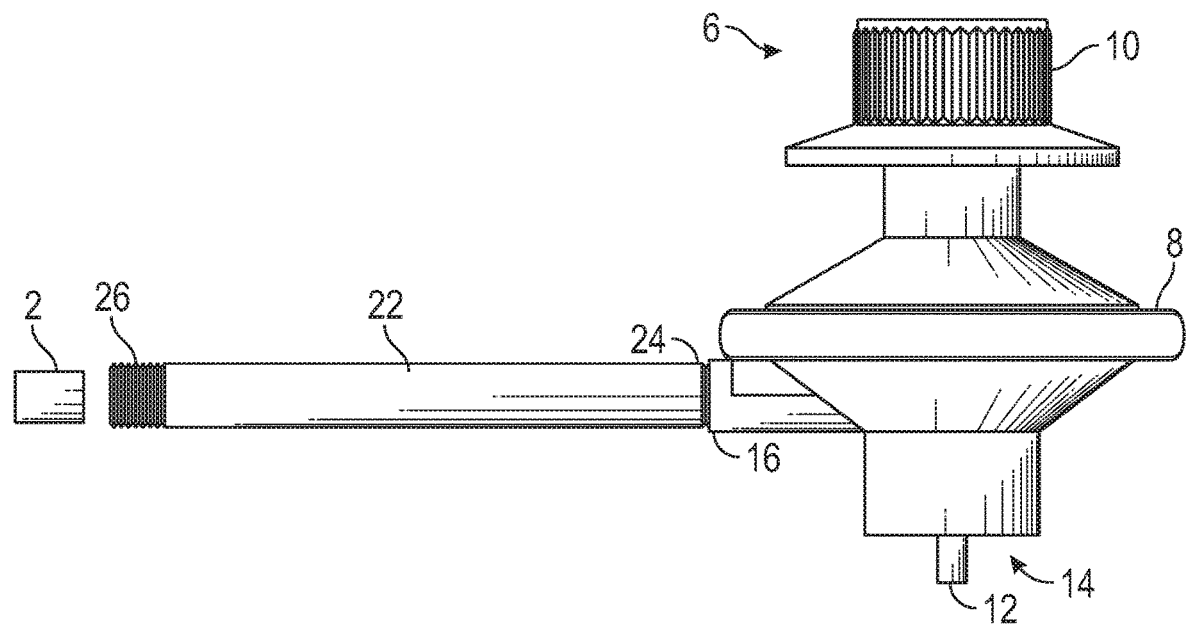
FIG. 1 depicts a side view of our regulator, as shown and described herein.

FIG. 1 depicts a side plan view of a regulator assembly. As shown in FIG. 1, the regulator assembly can comprise a regulator 6, an extension pipe 22, and an orifice 2. The orifice 2 can be seated, disposed, or placed within the extension pipe 22. The extension pipe 22 can include a cylindrical and hollow body having an interior space for carrying and directing gas from the regulator 6 to its distal end 26. The extension pipe 22 can attach to the regulator 6 at its first end 24, or proximal end, and be configured to attached to a cooking apparatus and/or burner at its second end 26, or distal end.

As shown, the orifice 2 can include a generally cylindrical body that is sized and shaped to fit firmly within the inner diameter of the extension pipe 22. The outer diameter of the orifice 2 can be the same as, almost the same as, approximately the same as, slightly smaller than, or about the inner diameter of the extension pipe so that the outer surface of the orifice 2 fits firmly against the interior surface of the extension pipe 22. In one or more embodiments, a variety connection means for securing the orifice 2 within the extension pipe 22 can be used and can include threading, welding, glue, cement, gum, plaster, and/or connection means commonly known in the art. In an alternative embodiment, the orifice 2 can be manufactured within the extension pipe 22 such that the orifice 2 and extension pipe 22 are made of the same piece of material.

The extension pipe 22 can have one or more means of attaching or connecting to the regulator 6. As shown, the regulator gas outlet 16 can have a threaded portion, in this embodiment a "female" threaded attachment. The proximal end 24 of the extension pipe 22 can have a corresponding or matching threaded portion, in this embodiment a "male" threaded attachment. The extension pipe 22 can be threaded or have connection means at both of its first end 24 and second end 26. The extension pipe 22 can be made of steel, aluminum, a metal alloy, plastic, wood, or other suitable material.

The regulator 6 can have a main body 8, a knob 10, a gas inlet 12, a gas supply connector 14, and a gas outlet 16, or any combination thereof. In one or more embodiments, the regulator 6 can be any regulator known in the art and/or a regulator commonly used for indoor and/or outdoor appliances, including liquified petroleum gas (herein, "LP gas")

regulator(s). The regulator can also be known as a "gas regulator" and/or a "pressure regulator," and generally serve as a control valve that reduces pressure of a fluid to a desired value at its output. In one or more embodiments, the regulator is suitable for propane and/or butane gas systems. The regulator 6 can be a lower pressure regulator, high pressure regulator, first stage regulator, second stage regulator, integral two-stage regulator, adjustable high-pressure regulator, or an automatic changeover regulator.

The fluid entering the regulator 6 can enter through the gas inlet 12. Depending on the source of the gas, the gas inlet 12 can be shaped and sized to accommodate the connectors of gas bottles and/or transport hoses. The regulator 6 can also include a means for attached to a gas bottle or transport hose, and most often includes a threaded gas supply connector 14 as shown.

The knob 10 of the regulator 6 is suiting to stop and start and/or increase and decrease the flow of gas through the regulator 6 by manually turning the know to the preferred flow setting.

Figure 2:
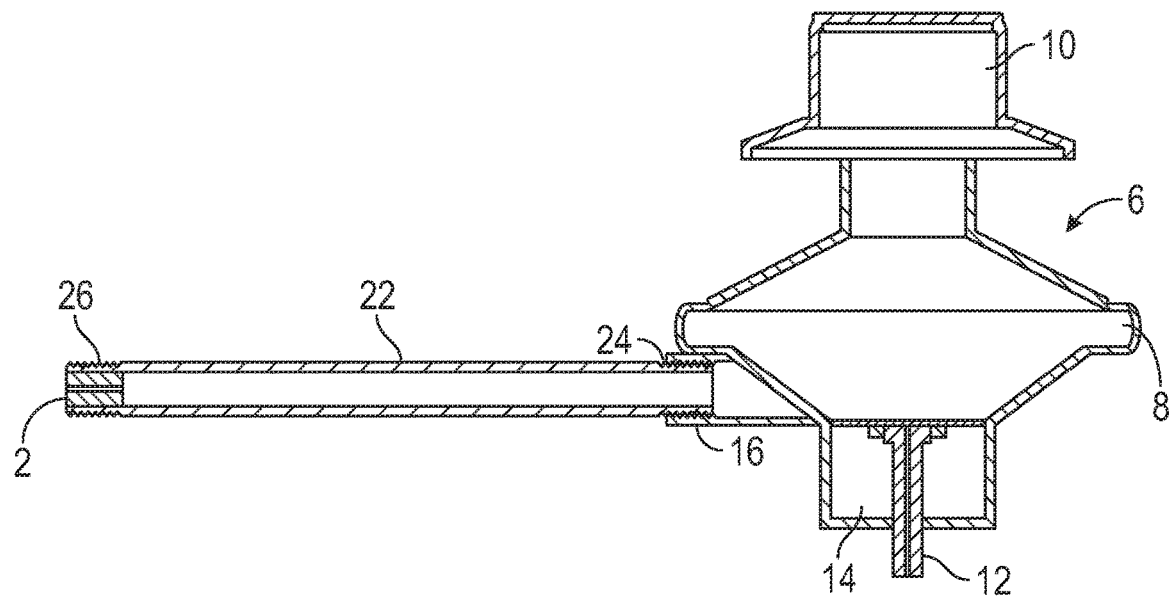
FIG. 2 depicts a cross-sectional view of the regulator, as shown and described herein.

FIG. 2 depicts a cross sectional side view of the regulator assembly. As shown in FIG. 2, the orifice 2 can be disposed in the extension pipe 22.

Generally, the extension pipe 22 is hollow and is used to deliver gas from the regulator 6 to a burner, where the gas will be ignited. In most embodiments, the orifice 2 will be disposed within the extension pipe 22 at the end of the extension pipe that is connected to the burner. However, though not show, the orifice 2 can be disposed in the extension pipe 22 anywhere along its length, including the end connecting to the regulator.

Figure 3:
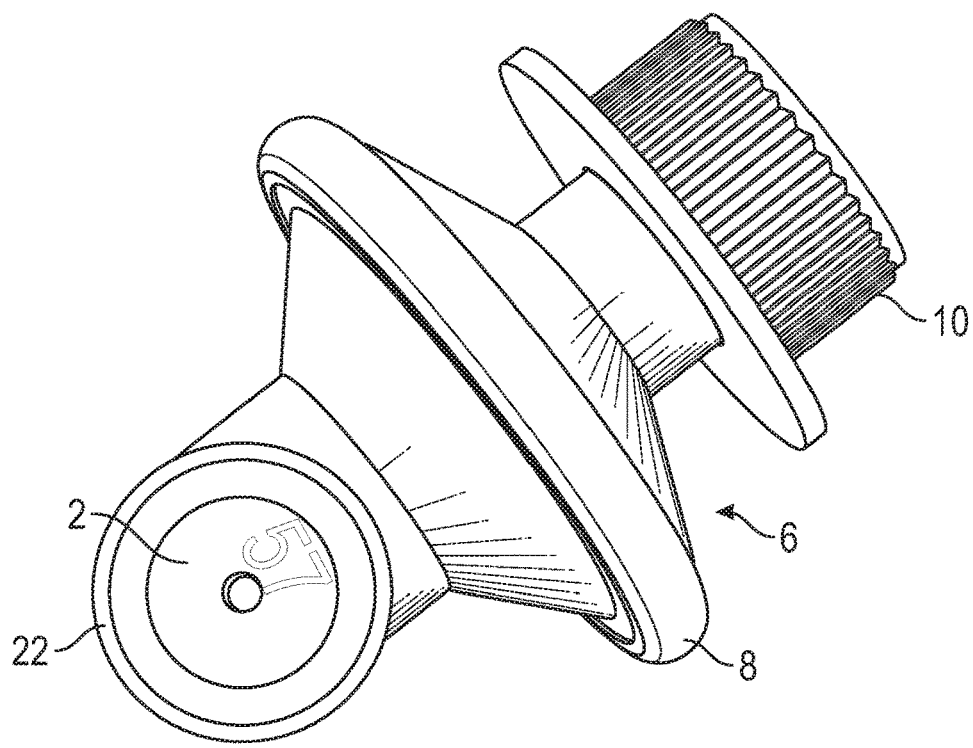
FIG. 3 depicts a front side view of the regulator, as shown and described herein.
Figure 4:
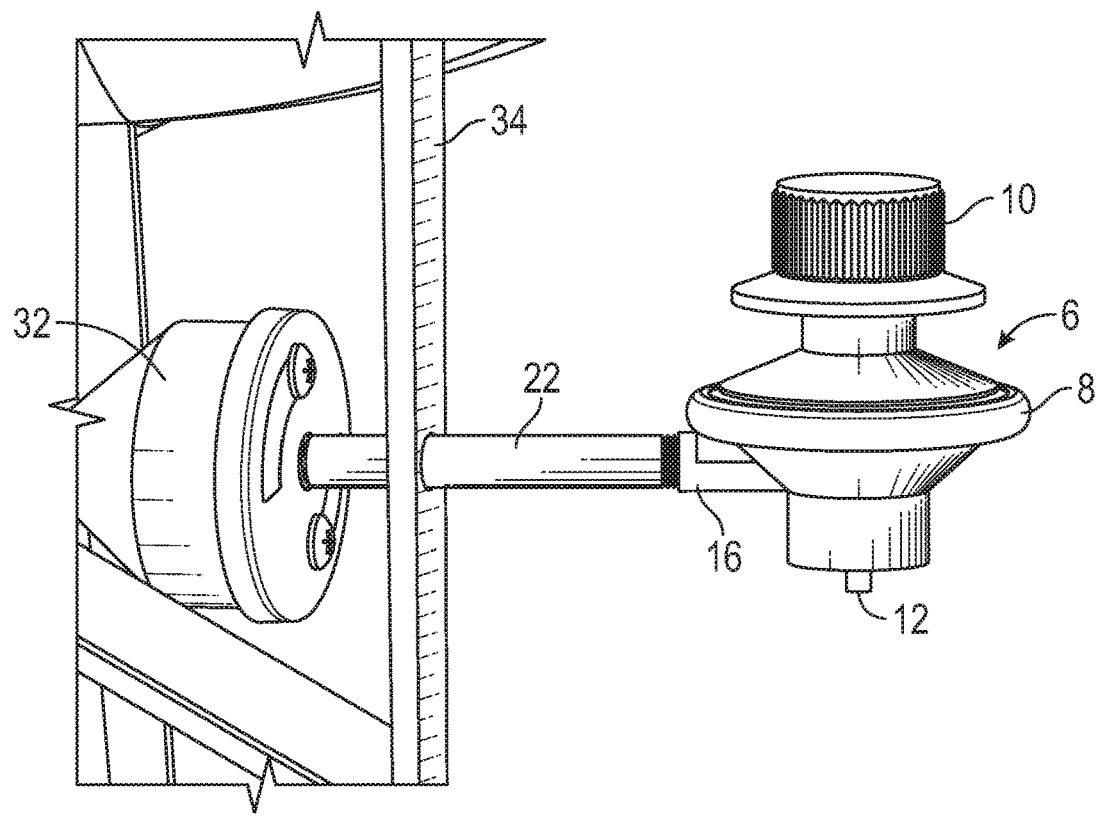
FIG. 4 depicts the regulator attached to a cooking device, as shown and described herein.

FIG. 3 depicts an end view of the regulator assembly. As shown in FIG. 3, the orifice 2 can be seated in the end of the extension pipe 22. FIG. 4 depicts the regulator assembly connected to a burner 32 of a cooking/heating apparatus 34. Typical grilling apparatuses, including various types of grills, include one or more low pressure burners with a low-pressure gas supply and a low-pressure regulator. Some cooking apparatuses, including boilers and frying stations, use high-pressure burners with high-pressure gas supply and a high-pressure regulator. One benefit of using the disclosed orifice 2 is to create a cooking system that uses a high-pressure burner with a lower pressure gas supply that uses a low pressure regulator. The regulator 6 disclosed herein provides higher pressure and gas flow to a high pressure burner than is typically found in low-pressure systems, all while using low pressure gas source and low pressure regulator components. This not only provides a heat range for desirable cooking temperatures, but greatly increases the efficiency of gas use.

The placement of the orifice within the extension pipe creates exceptional and beneficial results to the manufacturer, seller, and user. A pressure regulator's primary function is to match the flow of gas through the regulator to the demand for gas placed upon it, whilst maintaining a constant output pressure. The two LP gases, Butane and Propane, are very similar, and consequently many domestic appliances (e.g. most domestic cookers) are designed to run on either gas, but the standard supply pressure is somewhat different for each gas to accommodate the differences in the characteristics of the two gases. In the case of Butane, the standard supply pressure is 28 mbar (11" water column) and for Propane it is 37 mbar (14" water column)—regulators that supply either of these pressures are called "low pressure regulators". Low pressure propane regulators come in a few varieties, including preset, first stage, second stage, and twin stage.

The orifice can have a hole disposed through it for the gas to flow. The hole through the orifice, assuming its generally cylindrical like the extension pipe, can have a diameter smaller that the diameter of the extension pipe. For example, in an embodiment where the extension pipe 22 is ⅜ inch to about ¼ inch in diameter, the internal hole in, or through, the orifice, can be as small as $^{40}/_{1000}$ inch. In another embodiment, the hole in the orifice can be 1.06 millimeters.

This decrease in diameter of the orifice causes the gas passing through the regulator assembly to change its flow rate and generally increase in pressure prior to the gas entering the burner. The change in flow rate and pressure of the gas can provide a benefit to the user by increasing flame control, gas burning efficiency, and temperature at which the flame burns. At an 11 inch water column, that small hole will pass enough gas to give a user of a cooking device the heat of fire he needs to cook food. The desired ranged disclosed herein is about 14,000 btu. For purposes of this disclosure, a cooking assembly having a high pressure burner and using the disclosed adjustable regulator can produce heat in a range of about 14,000 btu to about 16,000 btu (on high setting). The same cooking assembly produces less than 10,000 btu when the orifice is not present.

In one or more embodiments, a cooking assembly containing a high pressure burner and the regulator with orifice as disclosed herein can produce a btu output of up to 17,000 btu, up to 16,500 btu, or up to 16,000 btu. In one or more embodiments, a cooking assembly containing a high pressure burner and the adjustable regulator with orifice as disclosed herein can produce a btu output of up to 15,800 btu, up to 15,500 btu, or up to 15,000 btu. In one or more embodiments, a cooking assembly containing a high pressure burner and the adjustable regulator with orifice as disclosed herein can produce a btu output of as low as 8,000 btu, as low as 7,500 btu, or as low as 7,000 btu. In one or more embodiments, a cooking assembly containing a high pressure burner and the adjustable regulator with orifice as disclosed herein can produce a btu output of as low as 6,500 btu, as low as 6,000 btu, or as low as 5,500 btu.

As gas passes into the regulator from the gas bottle/line connection, the control knob allows the user to select the volume of gas is directed downstream to the burner. The knob can essentially allow the user to select downstream "low" to "high" settings of the flame or heat at the burner. The gas is then directed into the extension pipe. The extension pipe will have a predetermined inner diameter. The orifice can be disposed in the inner diameter of the extension pipe so that when the gas flows through the smaller inner diameter of the orifice, its pressure and flow rate are increased.

Although the present invention has been described with respect to specific details, it is not intended that such details be regarded as limitations on the scope of the invention, except to the extent that they are included in the accompanying claims. It will thus be appreciated that those skilled in the art will be able to devise numerous alternative arrangements that, while not shown or described herein, embody the principles of the invention and thus are within its spirit and scope.

What is claimed is:
1. A low-pressure regulator assembly for a high-pressure burner, the low-pressure regulator assembly comprising:
   a low-pressure regulator having a gas inlet and a gas outlet, the low-pressure regulator configured to receive gas at a pressure between 28 mbar and 37 mbar;

an extension pipe having a proximal end connected to the low-pressure regulator and a distal end configured for connection to the high-pressure burner; and an orifice disposed in the extension pipe and having an inner diameter sized to increase pressure and gas flow to enable use of a low-pressure gas supply with the high-pressure burner, the orifice is comprised in a cylindrical body disposed within the extension pipe, wherein the extension pipe comprises a stiffness that allows at least the low-pressure regulator to be suspended by the extension pipe.

2. The regulator assembly of claim 1, wherein the extension pipe is cylindrical having an inner diameter and the orifice is cylindrical having an outer diameter such that the orifice fits firmly in the inner diameter of the extension pipe.

3. The regulator assembly of claim 1, wherein the orifice is threadably connected to the extension pipe.

4. The regulator assembly of claim 1, wherein the regulator assembly regulates gas flow from a gas source to a burner of a cooking apparatus.

5. A low-pressure regulator assembly for a high-pressure burner, the low-pressure regulator assembly, comprising:

a regulator for controlling the flow of gas from a low-pressure source to the high-pressure burner of a heating apparatus;

an extension pipe extending from a gas outlet of the low-pressure regulator, wherein the extension pipe comprises an interior diameter of about ⅜ of an inch to about ¼ of an inch; and an orifice disposed entirely in the interior diameter of the extension pipe, the orifice comprising an interior diameter of $^{40}/_{1000}$ of an inch.

6. The regulator assembly according to any of claim 1 or 5, wherein the extension pipe comprises a consistent diameter throughout the length of the extension pipe.

7. The regulator assembly according to any of claim 1 or 5, wherein the extension pipe comprises a stiffness that allows at least the regulator to be suspended substantially parallel to a burner.

8. The regulator assembly according to any of claim 1 or 5, wherein the extension pipe comprises a length that allows at least the regulator to be accessible when the regulator assembly is affixed to at least one of a cooking apparatus and a heating apparatus.

9. The regulator assembly according to any of claim 1 or 5, wherein the orifice is formed from the same piece of material as the extension pipe.

\* \* \* \* \*